US007540417B2

(12) United States Patent
Namiki

(10) Patent No.: US 7,540,417 B2
(45) Date of Patent: Jun. 2, 2009

(54) APPARATUS FOR PROCESSING ELECTRONIC TAG INFORMATION, POS TERMINAL, AND PROGRAM FOR PROCESSING ELECTRONIC TAG INFORMATION

(76) Inventor: Hideaki Namiki, 6-21-11, Aihara, Sagamihara-shi, Kanagawa (JP) 229-1101

( * ) Notice: Subject to any disclaimer, the term of this patent is extended or adjusted under 35 U.S.C. 154(b) by 218 days.

(21) Appl. No.: 10/582,620

(22) PCT Filed: Dec. 10, 2004

(86) PCT No.: PCT/JP2004/018511

§ 371 (c)(1),
(2), (4) Date: Jun. 12, 2006

(87) PCT Pub. No.: WO2005/057511

PCT Pub. Date: Jun. 23, 2005

(65) Prior Publication Data

US 2007/0114276 A1 May 24, 2007

(30) Foreign Application Priority Data

Dec. 12, 2003 (JP) ............................ 2003-415158

(51) Int. Cl.
*G06K 15/00* (2006.01)

(52) U.S. Cl. ...................................... 235/383; 235/378

(58) Field of Classification Search ................ 235/383, 235/451, 492, 380, 375, 378, 381, 385
See application file for complete search history.

(56) References Cited

U.S. PATENT DOCUMENTS

| | | | | |
|---|---|---|---|---|
| 6,843,415 | B2 * | 1/2005 | Vogler | 235/385 |
| 2003/0216969 | A1 * | 11/2003 | Bauer et al. | 705/22 |

FOREIGN PATENT DOCUMENTS

| | | | |
|---|---|---|---|
| JP | 10-049756 | A | 2/1998 |
| JP | 2000-030150 | A | 1/2000 |
| JP | 2000-289721 | A | 10/2000 |

* cited by examiner

*Primary Examiner*—Kumiko C Koyama
(74) *Attorney, Agent, or Firm*—Browdy and Neimark, P.L.L.C.

(57) ABSTRACT

To output a proper statement of sale even if electronic tags are attached to both of a set product and individual products contained in the set product.

A database managed in a unified way comprises a product table having data of product codes and set flags each indicating whether it is a set product or not, and a set product table having data of product codes of the respective set products, and the product code and number of individual products contained in each set product. For each product ID provided, a POS terminal increments a cumulative count "Ni" of the product (S4). When determined that the product ID is of a set product with referring to the product table (S3, S5), the set product table is referred to subtract the number "nj" of individual products contained in the set product from the cumulative count "Nj" thereof (S6, S7). In response to the end of reading (S8, S9), output is information associated with a product identification code whose count is not zero and the count.

8 Claims, 8 Drawing Sheets

FIG.4

PRODUCT TABLE (A)

| PRODUCT ID | F | PRODUCT NAME | PRICE | |
|---|---|---|---|---|
| ID1 | 1 | PN1 | 980 | |
| ID2 | 0 | PN2 | 100 | |
| ⋮ | ⋮ | ⋮ | ⋮ | ⋮ |

SET PRODUCT TABLE (B)

| "A" PRODUCT ID | "E" PRODUCT ID | COUNT | "E" PRODUCT ID | COUNT | ----- |
|---|---|---|---|---|---|
| ⋮ | ⋮ | ⋮ | ⋮ | ⋮ | ----- |
| ID1 | ID2 | n2 | 0 | 0 | ----- |
| ⋮ | ⋮ | ⋮ | ⋮ | ⋮ | ----- |

(C)

| | | | |
|---|---|---|---|
| ID1 | 1 | ID2 | n2 |

FIG.6

(A)

| PRODUCT ID | F | PRODUCT NAME | PRICE | COUNT | PARTIAL SUM |
|---|---|---|---|---|---|
| ID1 | 1 | PN1 | 980 | 1 | |

(B)

| PRODUCT ID | F | PRODUCT NAME | PRICE | COUNT | PARTIAL SUM |
|---|---|---|---|---|---|
| ID1 | 1 | PN1 | 980 | 1 | |
| ID2 | 0 | PN2 | 100 | -10 | |

(C)

| PRODUCT ID | F | PRODUCT NAME | PRICE | COUNT | PARTIAL SUM |
|---|---|---|---|---|---|
| ID1 | 1 | PN1 | 980 | 1 | |
| ID2 | 0 | PN2 | 100 | 0 | |

(D)

| PRODUCT ID | F | PRODUCT NAME | PRICE | COUNT | PARTIAL SUM |
|---|---|---|---|---|---|
| ID1 | 1 | PN1 | 980 | 1 | 980 |
| ID2 | 0 | PN2 | 100 | 0 | |
| | | | | SUM | 980 |

*FIG. 7*

(A)

| PRODUCT ID | F | PRODUCT NAME | PRICE | COUNT | PARTIAL SUM |
|---|---|---|---|---|---|
| ID1 | 1 | PN1 | 980 | 1 | 980 |
| ID2 | 0 | PN2 | 100 | -1 | -100 |
| | | | | SUM | 880 |

(B)

| PRODUCT ID | F | PRODUCT NAME | PRICE | COUNT | PARTIAL SUM |
|---|---|---|---|---|---|
| ID1 | 1 | PN1 | 980 | 1 | 980 |
| ID2 | 0 | PN2 | 100 | 1 | 100 |
| | | | | SUM | 1080 |

(A)

(B)

SET PRODUCT TABLE

| No. | PRODUCT ID | COUNT | POINTER |
|---|---|---|---|
| 1 | ID2 | 3 | 2 |
| 2 | ID3 | 2 | 0 |
| ⋮ | ⋮ | ⋮ | ⋮ |
| 102 | ID4 | 1 | 103 |
| 103 | ID5 | 3 | 0 |
| ⋮ | ⋮ | ⋮ | ⋮ |
| 157 | ID6 | 2 | 0 |
| ⋮ | ⋮ | ⋮ | ⋮ |

APPARATUS FOR PROCESSING ELECTRONIC TAG INFORMATION, POS TERMINAL, AND PROGRAM FOR PROCESSING ELECTRONIC TAG INFORMATION

TECHNICAL FIELD

The present invention relates to an apparatus for processing electronic tag information, a POS terminal, and a program for processing electronic tag information.

BACKGROUND ART

The popularization of systems are expected which use electronic tags instead of barcodes and receive radio waves radiated from electronic tags to read product information. For example, by being equipped with a plurality of antennas for a tag reader and switching antennas to scan, it is possible to read information of plural tags at high speed (Patent Literature 1).

By the way, a set product in which a plurality of individual products are packaged, for example, a carton in which ten packs of cigarettes are contained is a unit for sale, and an electronic tag is stuck on the carton. However, when separately selling the individual products within a set product, i.e., a unit, electronic tags must be stuck on respective packs at a retail store, which is complicated. Therefore, it is desirable to stick electronic tags on both the carton and every inner at the factory.

Although the inside packs can not be seen from the outside, a tag reader can not distinguish on which of the outside and inside boxes electronic tags are attached. Thus, both of the electronic tag information is read through radio waves, and the problem of double counting occurs.

Specifically, when reading electronic tags of both of a carton of products and individual products for separate sale, there arise a problem in sale management because the tag reader cannot distinguish between a tag stuck on a product inside the carton and a tag stuck on a individual product for separate sale.

The problem of double counting will be solved by writing information regarding whether or not a product is for separate sale on each electronic tag and information that no counting of individual products in a carton which cannot be separated for sale.

However, in a case where set products are entered into a retail store to decide whether they are to be separately sold or not, it is necessary, at the stage of separate sales, to write information whether or not a separate sale is permitted for each electronic tag, which is complicated. Furthermore, there arises a problem of double counting when the writing is not performed because of forgetting the writing, the writing time being not enough, or a radio wave for writing being too weak.

Hereinafter, "set product" and "individual product" may include packages (wrapping paper, packaging bag or packaging container), and "the individual product" may not be packaged.

PATENT LITERATURE 1: Publication number 2000-187715 of Japanese patent application

BRIEF DESCRIPTION OF THE DRAWINGS

FIGS. 4(A), (B), and (C) are illustrations of a product table, a set product table, and an electronic tag, respectively.

FIGS. 6(A)-(D) are illustrations of a sale-statement table explaining the processing of FIG. 5.

FIGS. 7(A) and (B) are illustrations of the sale-statement table explaining the processing of FIG. 5.

SUMMARY

Figure 1:
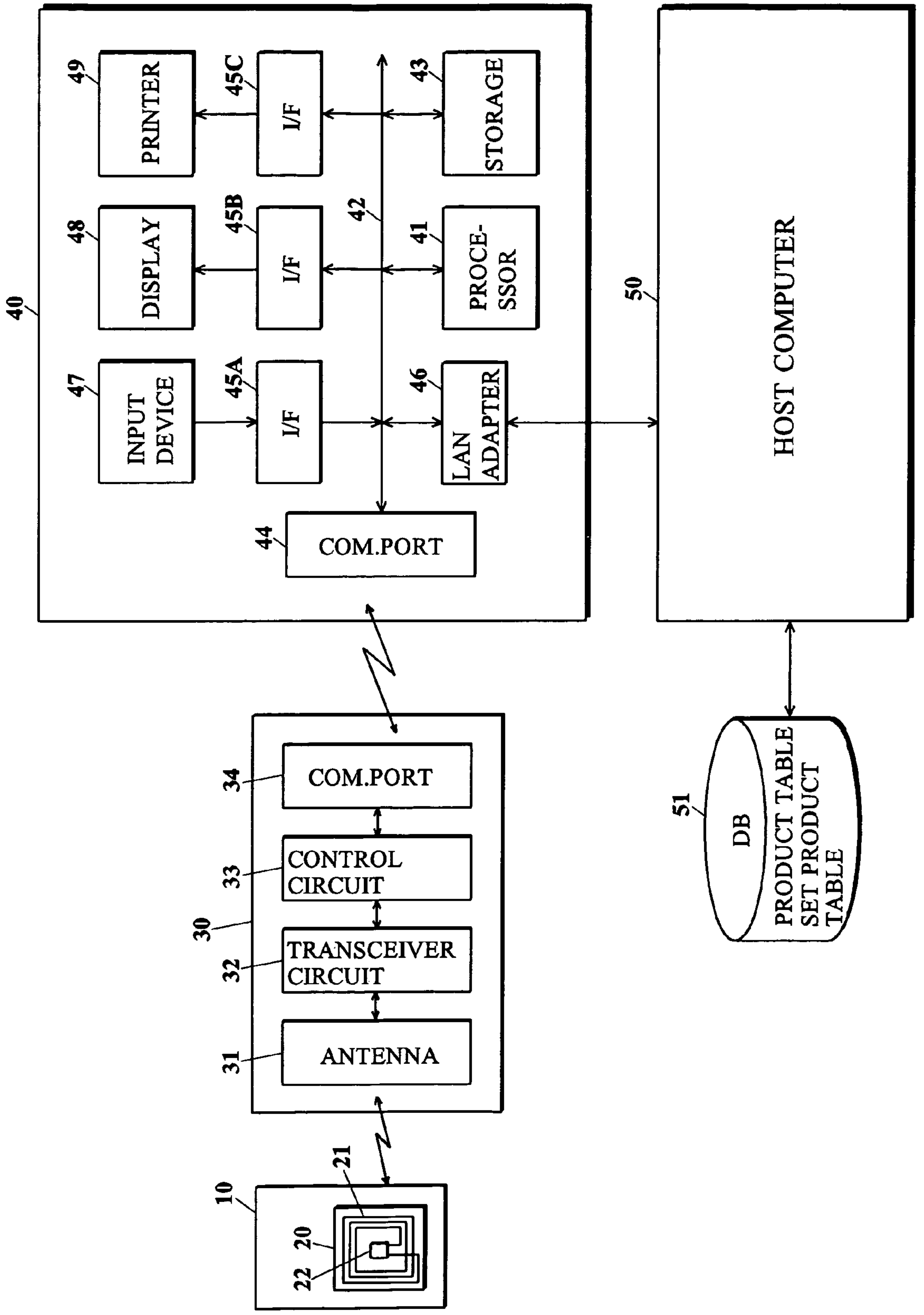
FIG. 1 is a block diagram showing a schematic configuration of a POS system of a first embodiment according to the present invention.

One object of the present invention is to output a proper statement of sale even if electronic tags are attached to both of a set product and individual products contained in the set product. Accordingly to the present invention, this can be accomplished by a database managed in a unified way comprises a product table having data of product codes and set flags each indicating whether it is a set product or not, and a set product table having data of product codes of the respective set products, and the product code and number of individual products contained in each set product. For each product ID provided, a POS terminal increments a cumulative count "Ni" of the product (S4). When determined that the product ID is of a set product with referring to the product table (S3, S5), the set product table is referred to subtract the number "nj" of individual products contained in the set product from the cumulative count "Nj" thereof (S6, S7). In response to the end of reading (S8, S9), information is output associated with a product identification code whose count is not zero and the count. Accordingly, one object of the present invention is to provide an apparatus for processing electronic tag information, a POS terminal, and a program for processing electronic tag information which can output a proper statement of sale even if electronic tags are attached to both of a set product and individual products contained in the set product.

Another object of the present invention is to provide an apparatus for processing electronic tag information, a POS terminal, and a program for processing electronic tag information which can verify whether or not individual products are contained in a set product without excess or deficiency even if the inside of the set product can not be seen from the outside.

In one aspect of an apparatus for processing electronic tag information according to the present invention, the apparatus receives product identification codes read from electronic tags, the apparatus comprises:

a processor; and a storage device, coupled to the processor, having a computer program stored therein;

wherein product information is provided, or stored in the storage device, characterized in that the product information includes: an identification code of a set product; an identification code of individual products contained in the set product; and a number of the individual products, and the computer program causes the processor to substantially perform the steps of:

(a) for each product identification code read from an electronic tag and provided, incrementing a corresponding product cumulative count Ni, where "i" corresponds to a product identification code;

(b) referring to the product information, when judging that the product identification code read from the electronic tag and provided is a set product, subtracting a number nj of individual products of the set product from a product cumulative count Nj of the individual products; and (c) in response to the end of information-reading from at least one electronic tag, outputting information associated with a product identification code whose product cumulative count Nk is not zero and the product cumulative count Nk.

With the above described aspect of the present invention, it is possible to output a proper statement of sale even if electronic tags are attached to both of a set product and individual products contained in the set product. Therefore, when separately selling the individual products in the set product, it is not necessary to attach electronic tags to the individual products at a retail store. Furthermore, there is no need to write information showing to be separate sale into electronic tags, therefore it is possible to prevent from occurring calculation error in sale-statement because of forgetting to write the information and thereby the way of calculation becoming different.

Moreover, it is possible to prevent from occurring disadvantage to buyer and dealer even if a set product has an excess or deficiency, and also the excess or deficiency of the individual products contained in the set product can be verified even if the contents can not be seen from the outside.

PREFERRED EMBODIMENTS FOR IMPLEMENTING THE INVENTION

Referring to the drawings, embodiments of the present invention will be described hereinafter.

First Embodiment

FIG. 1 is a block diagram showing a schematic configuration of a POS system of a first embodiment according to the present invention.

Electronic tag 20 is equipped with a substrate, an antenna coil pattern 21 provided onto the substrate, and an IC chip 22.

Figure 2:
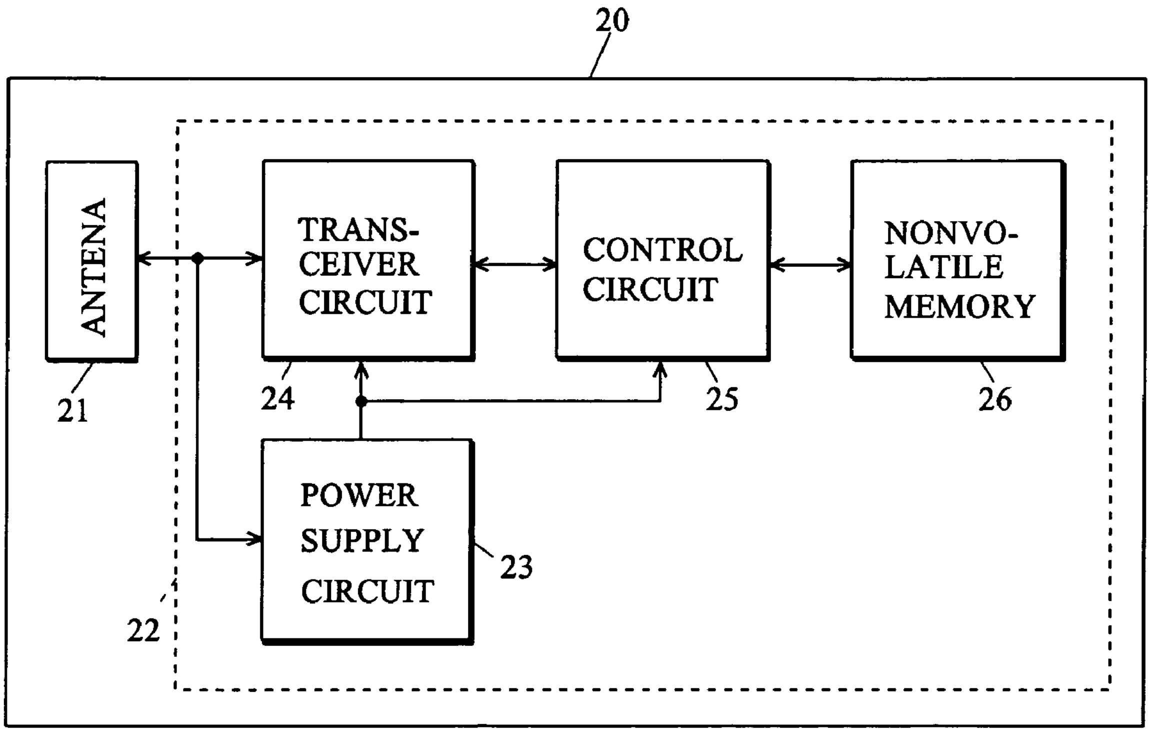
FIG. 2 is a block diagram showing a configuration of an electronic tag in FIG. 1.

The IC chip 22, as shown in FIG. 2, comprises elements 23-26. Power supply circuit 23 is equipped with a capacitor connected in parallel to the antenna coil 21, and a rectification circuit. The electronic current induced in the antenna 21 by electromagnetic waves within the antenna coil 21 is rectified, and an electronic charge is accumulated to the capacitor to drive a transmitting and receiving circuit 24 and a control circuit 25.

After the starting of drive, a tune signal received with antenna 21 is demodulated by the transmitting and receiving circuit 24 and provided to a control circuit 25. When the signal is a data read command, the control circuit 25 reads data stored in non-volatile memory 26 and supplies to the transmitting and receiving circuit 24. The transmitting and receiving circuit 24 performs a phase modulation for a carrier wave to provide to the antenna 21. When the signal is a data write command, the control circuit 25 writes data from the transmitting and receiving circuit 24 into the non-volatile memory 26. The stored information in the non-volatile memory 26 includes at least a product identification code.

Referring back to FIG. 1, a reader/writer 30 performs information-reading from the electronic tag 20 and information writing into the electronic tag 20 through radio waves.

The reader/writer 30 comprises elements 31-34. In the reader/writer 30, in the case of reception, a transmitting and receiving circuit 32 demodulates a signal from an antenna 31 and stores data of the demodulated signal through a control circuit 33 into buffer memory in a communication port 34. In the case of transmission, the reverse operation is performed. The control circuit 33 controls the operation of the transmitting and receiving circuit 32 and the communication port 34.

In FIG. 1, although a single antenna 31 is shown for simplification, a plurality of antennas may be provided to scan with switching from one to another antenna in order.

A read command, a write command and data to be written are provided to the communication port 34 from a POS terminal 40, and read data is provided to the POS terminal 40 from the communication port 34.

The POS terminal 40 comprises elements 41-51. A processor 41 is coupled through a bus 42 to a storage device 43 and a communication port 44, and is also coupled through interfaces 45A, 45B and 45 C and LAN adapter 46 to an input device 47, a display 48, a printer 49 and a host computer 50, respectively. The storage device 43 is provided with a memory device and an external storage such as a hard disk drive.

A plurality of POS terminals 40 are coupled through a LAN to one host computer 50, and a reader/writer 30 is provided for each POS terminal 40. In FIG. 1, only one set of the reader/writer 30 and POS terminal 40 is shown for simplification.

A database 51 for managing the sale and stock of products under one umbrella is stored in an external storage coupled to the host computer 50.

This embodiment has characteristics in that the database 51 contains a specific table of products and a specific table of set products, and in that the storage device 43 stores a specific program for processing with referring to the tables.

Figure 3:
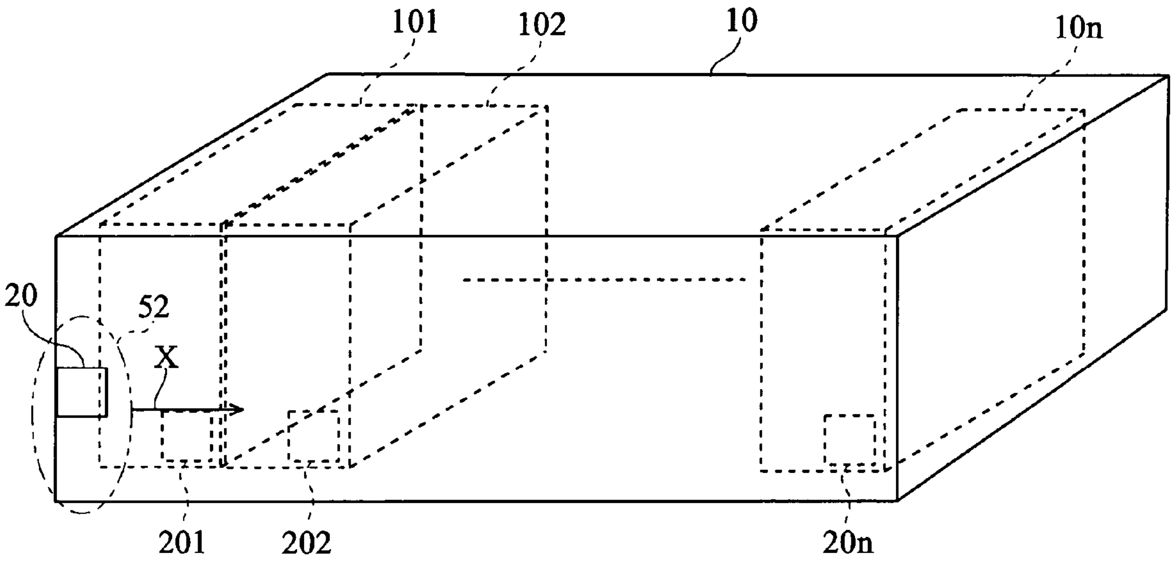
FIG. 3 is schematic perspective view of relationship between a set product and individual products having electronic tags.

FIG. 3 is a perspective illustration showing a relationship between a set product and individual products.

The set product 10 has "n" individual products 101 to **10*n* packed in an opaque package, and an electronic tag 20 is stuck on the set product 10 and electronic tags 201 to 20*n* are stuck on individual products 101 to 10*n***, respectively.

It is not possible because of electromagnetic interference to read electronic tag information if the antenna 31 receives response radio waves at the same time from a plurality of electronic tags on which radio waves have been irradiated from the antenna 31 at the same time. Therefore, it is arranged so that more than one electronic tag is not included in a readable range 52 shown with an alternate-long-and-short-dash-line. The size of the readable range 52 depends on the shape of antenna 31, the interval between the antenna 31 and the +-electronic tag, and a radio frequency. The readable range 52 is scanned in "X" direction in relation to the set product 10. For example, this scan is performed by switching a plurality of antennas 31 in order in such a manner described above.

FIGS. 4(A) and 4(B) show a product table and a set product table, respectively.

The product table includes the fields of a product identification code (product ID), a set flag "F", a product name, a retail price and others. The set flag "F" means whether it is a set product or not, where F="1" corresponds to a set product and F="0" corresponds to an individual product. Assume that in FIG. 3, the product identification code, the product name and the retail price of the set product 10 are ID1, PN1 and 980 yen, respectively, and that the individual products 101-**10*n*** are identical to each other and the product identification code, the product name and the retail price of each of the individual products 101-10*n* are ID2, PN2 and 100 yen, respectively.

The set product table in FIG. 4(B) shows the composition of each set product with F="1" in the product table, and set products and individual products are respectively represented as "PRODUCT A" and "PRODUCT E". If a record of the set product table is, for example, ID1, ID2, n2, 0, . . . , it shows that the set product having the product identification code ID1 are packed with n2 individual products having the product identification code ID2. "0" after "n2" is an end mark, which shows that this set product contains no other individual product.

On the other hand, there are a read mode and a write mode to the tag as operation modes of the POS terminal 40 of FIG. 1, and the read mode includes a sale-statement mode and a verification mode. The verification mode is used for verifying whether or not a set product is packed with individual products of a predetermined number. The operation mode data is entered from input device 47 and stored in a memory of storage device 43 by the processor 41, and the read or write mode data is provided through the communication port 34 from communication port 44 to the control circuit 33 to be held.

Figure 5:
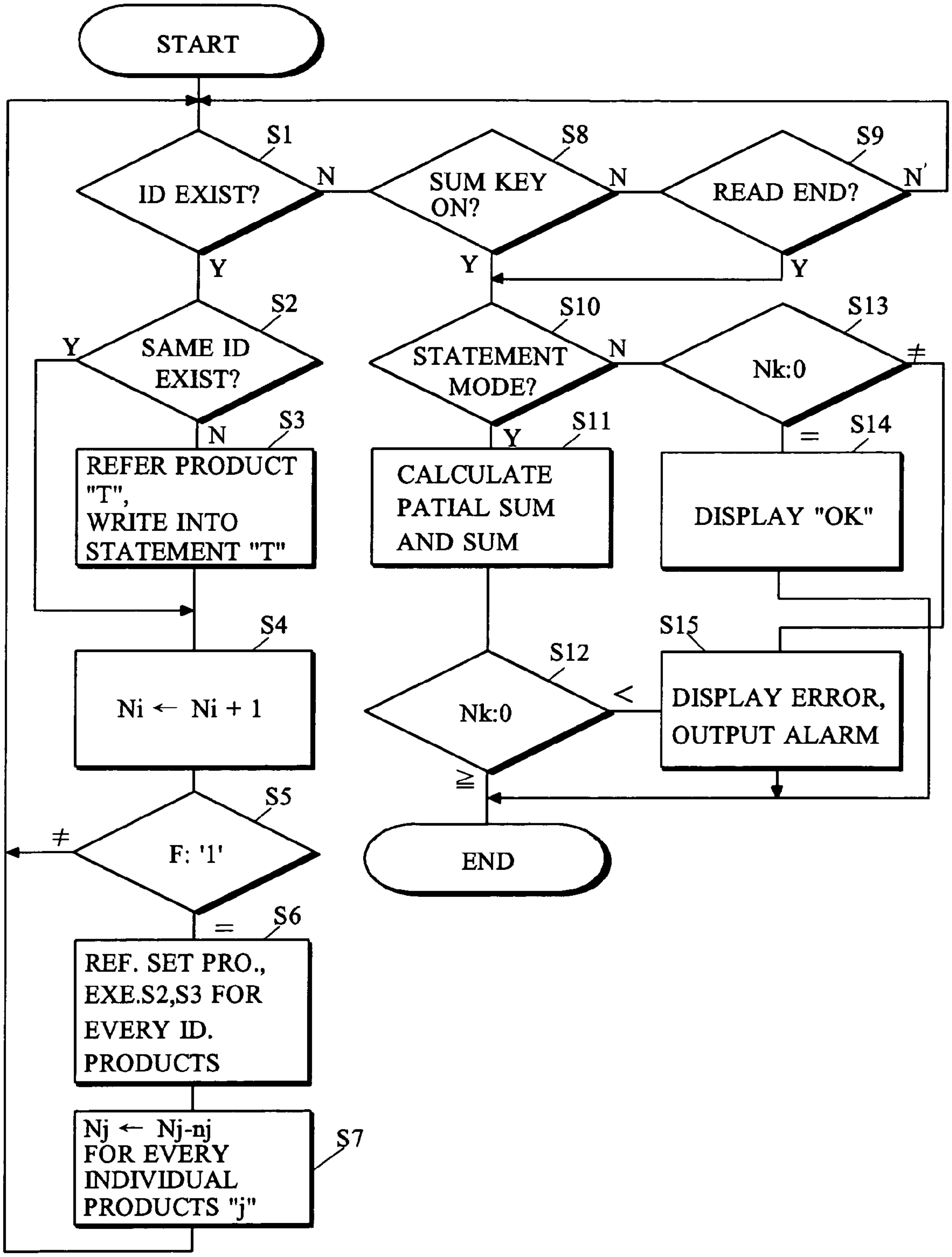
FIG. 5 is a flow chart showing the processing of a sales statement and verification program, which was loaded into memory of a storage device 43 from a host computer 50, in a mode of reading electronic tag information.

FIG. 5 is a flow chart showing the contents of sale-statement/verifying program loaded in the memory of storage device 43 from the host computer 50, in the read mode. Hereinafter, parenthesized characters are identification of the steps shown in FIG. 5.

A call signal from antenna 31 is scanned to the electronic tags, and in response to this signal, stored information including a product identification code is read from an electronic tag. The reader/writer 30 reads the information to store into the buffer memory (queue) in the communication port 44. On the other hand, an empty sale-statement table has been created in the memory of storage device 43 in an initialization process. In the case of the verification mode, as described below, this sale-statement table functions as a verification table. The contents of the sale-statement table are displayed on the screen of the display 48.

(S1) If there is data of one or more product identification codes in the buffer memory at the communication port 44, then a product identification code IDi thereof is taken out in, for example, FIFO order, and the processing goes to step S2, or else the processing goes to step S8.

(S2) If this product identification code IDi doesn't exist in the sale-statement table, then the processing goes to step S3, or else the processing goes to step S4.

(S3) With this product identification code IDi as a retrieval string, the product table (PRODUCT T) is referred to so as to find the product name, set flag "F" and unit price of the matched product identification code IDi, and these are entered into the sale-statement table.

(S4) The variable Ni, whose initial value is 0, of the cumulative count field of this product identification code IDi is incremented by one. With this, the sale-statement table becomes as shown in FIG. 6(A).

(S5) If the set flag "F" corresponding to this product identification code IDi is equal to "1", i.e. the product is a set product, then the processing goes to step S6, or else the processing returns to step S1.

(S6) With this product identification code IDi as a retrieval string, the set product table (SET T) is referred to so as to find a product identification code IDj and a number nj of individual products "j" of each subset (individual products "j" having different product-identification codes) consisting of the set product having the product identification code IDi, and the above described processing of steps S2 and S3 is performed for each product identification code IDj of individual product.

(S7) From the variable Ni, whose initial value is 0, of the cumulative count field in the sale-statement table, nj is subtracted. With this, the sale-statement table becomes as shown in FIG. 6(B). Next, the processing returns to step S1.

(S8) If the sum key of the input device 47 is pushed, then the processing goes to step S10, or else the processing goes to step S9.

(S9) If the communication port 44 has a read end code, then the processing goes to step S10, or else the processing returns to step S1. The read end code is provided from the control circuit 33 to the communication port 44 through the communication port 34 and is written in the buffer memory when the control circuit 33 has judged that a time has elapsed more than a set period of time after the last reading of stored information from an electronic tag.

Note that instead of the control circuit 33 judging the elapsed time, it may be such a configuration that according to a program, the processor 41 measures the consecutive processing time of the repeating loop of steps S1, S8 and S9 as a elapsed time.

In the case of FIG. 3, until completely reading of all the product identification codes of the electronic tags 20 and 201-20*n*, the processing of steps S1-S7 (which includes the case of processing a loop of steps S1, S8 and S9 and going to S2 from step S1) is repeated. With this, the sale-statement table becomes as shown in FIG. 6(C).

(S10) Referring to the memory of storage device 43, if the mode is a sale-statement mode, then the processing goes to step S11. If the mode is a verification mode, then the processing goes to step S13.

(S11) The partial sums and sum of the sale-statement table are calculated. With this, the sale-statement table becomes as shown in FIG. 6(D). In the sale-statement table, each product data in which the cumulative count is not zero is used for the print of receipt. The input device 47 is operated to enter a received amount of money, thereby the change is calculated, and the receipt having these data, the date and so on is output from the printer 49.

(S12) In regard to any individual product "k" with F="0" in the sale-statement table, if the cumulative count Nk is a negative value, the processing goes to step S15, or else the processing of FIG. 5 ends for a group of products which a customer has purchased.

(S13) In the verification mode, for any individual product "k" with F="0" in the sale-statement table, if the cumulative count Nk is not zero, the processing goes to step S15, or else the processing goes to step S14.

(S14) The verification processing for one or plural set products end with displaying "OK" on the screen of the display 48.

(S15) A blinking display is performed for a row whose cumulative count Nk of an individual product (F="0") is not 0 (but, a row of Nk<0 when the processing has gone to step S15 from step S12) in the sale-statement table displayed on the screen of the display 48, and an alarm is output from a speaker not shown in the drawings.

In such a way, verification for set products is automatically performed not only in the verification mode but also in the sale-statement mode, and the above described blinking and alarm inform a purchaser of it if there is any missing products. FIG. 7(A) shows the case where there is a missing product.

Even if a set product has a missing element(s), the buyer will not be disadvantages, because the fee for the element(s) is automatically subtracted from the total amount. It is possible to save the labor of the cashier, since there is no need to exchange the set product if the buyer consents.

FIG. 7(B) shows a case where a cumulative count of individual products packed in a set product is exceeded by one, or a case containing a set product and a separated individual product. In a case of excess, if a cashier notices the excess in comparing data on the screen of the display 47 with the sold products, the cashier will inform a buyer of the excess.

As described above, the following advantages are derived from this first embodiment.

(1) It is possible to correctly output a sale-statement even if electronic tags are attached to both of a set product and individual products packed in the set product.

(2) It is possible to prevent disadvantages from occurring to the buyer and the dealer, even if a set product has an excess or deficiency. Furthermore, if the set product has a missing element, it is automatically detected and reported by the processing of sale-statement.

(3) When separately selling individual products in a set product, it is not necessary to attach electronic tags to the individual products at a retail store. Furthermore, there is no need to write information showing to be separate sale into electronic tags, therefore it is possible to prevent calculation errors from occurring in the sale-statement because of forgetting to write the information and thereby the way of calculation becoming different.

(4) Specifically, when making set products for a season or bargains uniquely found at a retail store and selling them, even if the contents of the set products can not be seen, the kind and number of the contained products can be verified.

(5) Since it is possible to identify a set product by looking up a table, it is not necessary to write information showing to be a set product or not into respective electronic tags, therefore it is possible to prevent from occurring forgetting to write the information or writing error. Furthermore, the change is easy because it is only required to change the contents of the table.

(6) Since a product table has a field of set flag, there is no need to refer to a set product table when judging whether or not it is a set product, thereby achieving a high-speed processing.

Second Embodiment

Figure 8:
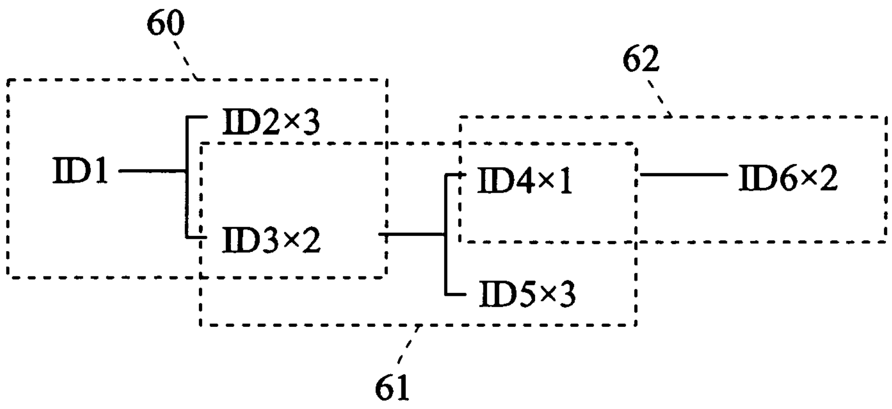
FIGS. 8(A) and (B) relate to a second embodiment of the present invention, (A) is an illustration of a hierarchical structure of a set product, and (B) is an illustration of a set product table corresponding to this structure.

FIG. 8(A) shows a hierarchical structure of products of a second embodiment according to the present invention.

The present invention can be applied to a set product having a hierarchical structure of multi-level, too, and in this embodiment, the set product consists of a three-level hierarchy. The highest level hierarchy 60 shows that a set product of identification code ID1 contains three individual products of an identification code ID2 and two individual products of an identification code ID3. The middle level hierarchy 61 shows that the set product of identification code ID3 contains one individual product of an identification code ID4 and three individual products of an identification code ID5. The lowest level hierarchy 62 shows that the set product of identification code ID4 contains two individual products of an identification code ID6.

The product of product identification code ID3 is the individual product of hierarchy 60 and is the set product of hierarchy 61, and the product of product identification code ID4 is the individual product of hierarchy 61 and is the set product of hierarchy 62.

In this case, each set flag "F" of identification codes ID1, ID3 and ID4 has a value of "1" in a product table.

It is clear that the processing is properly done by performing the processing of FIG. 5 for every level of hierarchy with F="1". Nk at steps S12 and S13 is a cumulative count for every individual product(s) (for every product ID of individual product(s)).

In actuality, the reading of electronic tags isn't always done for every hierarchy in order. However, processing complication is avoided because the processing is properly done regardless of hierarchical structure or order of reading electronic tags if the processing is performed in accordance with FIG. 5.

Although the set product table of FIG. 4(B) is easy to look when it is displayed, there are many zero data and the storage amount of the table becomes large. Therefore, used is the set product table of a list structure as shown in FIG. 8(B). No. is a number, e.g. a serial number, which never overlaps, and is automatically entered by a DBMS (Data Base Management System) in addition of a record. Assume that No. is not zero. Pointer indicates a No. of the next record following the current record, and the pointer of zero value means that further individual product isn't contained in the current level hierarchy.

When using this set product table, a corresponding product table includes a pointer pointing to a No in the set product table as a replacement of a set flag F in FIG. 4(A), and in a case of individual product, the pointer is set at zero. The following is a portion of the product table corresponding to FIG. 8(B).

| product ID | pointer | product name | price |
|---|---|---|---|
| ID1 | 1 | PN1 | 1400 |
| ID2 | 0 | PN2 | 100 |
| ID3 | 102 | PN3 | 600 |
| ID4 | 157 | PN4 | 80 |
| ID5 | 0 | PN5 | 200 |
| ID6 | 0 | PN6 | 40 |

In FIG. 5, if this pointer is 0 at step S5, the processing returns to step S1, or else the processing goes to step S6.

Which of product identification codes ID1 and ID3 is earlier read at step S1 depends on the directions of products, the attached positions of electronic tags, the way of scanning tags by reader/writer, and so on. When taking out ID3 at step S1, the following processing is done at steps S6 and S7.

(S6) The record of No.=102 in the set product table is obtained to perform the processing of steps S2 and S3 in regard to ID4. Since the pointer of this record is at 103, the record of No.=103 is obtained to perform the processing of steps S2 and S3 in regard to ID5. Since the pointer of this record is at 0, the processing goes to step S7.

(S7) In regard to the count N4 and N5 of the products of ID4 and ID5, the subtraction of

N4←N4−1, N5←N5−3 are performed. Next, the processing returns to step S1.

After that, when taking out ID1 at step S1, the following processing is done at steps S6 and S7.

(S6) The record of No.=1 in the set product table is obtained to perform the processing of steps S2 and S3 in regard to ID2. Since the pointer of this record is at 2, the record of No.=2 is obtained to perform the processing of steps S2 and S3 in regard to ID3.

(S7) In regard to the count N2 and N3 of the products of ID2 and ID3, the subtraction of

N2←N2−3, N3←N3−2 are performed. Next, the processing returns to step S1.

In this way, the processing of steps S6 and S7 is done only for one-level hierarchy in which the treating product of identification code IDi is a set product. With this, overlap processing is avoided regardless of a hierarchical structure or reading order of electronic tags.

Since a list table is used in this second embodiment, it is possible to process at a higher speed, and also to insert the information of a set product into any row of the set product table.

In a set product table, such a connection flag G may be used as a replacement of the pointer that if G="1", then the next record is regarded as one in the same level hierarchy, and if G="0", then it means that there is no more individual product contained in the same level hierarchy. Note that the present invention includes various kinds of modifications.

For example, instead of using a set product table, such information may be written in an electronic tag 20, as shown in FIG. 4(C), as a product identification code of a set product, a set flag, and a product identification code and a number of individual products contained in the set product.

In this case, there may be such a way of writing information into an electronic tag only for one set product, making the reader/writer 30 read this according to instructions of an interactive input-program, and making the information as a record add to the set product table of database 51 through the POS terminal 40.

This method enables to add a record to a set product table especially when making a unique set product with actually confirming the set product on a retail outlet side. Therefore, it is effective in preventing an entry mistake and easy for a salesperson to add the record.

In the above-described case, when the information of the set product can not be written in one electronic tag because many kinds of individual products are contained in the set product, such a way may be as writing the information into a plurality of electronic tags.

Such a configuration may be as judging whether a product is a set one or not referring to the set product table of FIG. 4(B) without being provided with set flag in the product table of FIG. 4(A).

Furthermore the database 51 of FIG. 1 may be stored in the storage device 43. The above-described tables in the database 51 may be updated through a network such as the Internet.

| | |
|---|---|
| 10 | set product |
| 101-10n | individual product |
| 20, 201-20n | electronic tag |
| 21, 31 | antenna |
| 22 | IC chip |
| 23 | power supply circuit |
| 24, 32 | transmitting and receiving circuit |
| 25, 33 | control circuit |
| 26 | nonvolatile memory |
| 30 | reader/writer |
| 34, 44 | communication port |
| 40 | POS terminal |
| 41 | processor |
| 42 | Bus |
| 43 | storage |
| 45A-45C | interface |
| 46 | LAN adapter |
| 47 | input device |
| 48 | display |
| 49 | printer |
| 50 | host computer |
| 51 | database |
| 52 | readable range |
| 60-62 | hierarchy |
| F | set flag |

What is claimed is:

1. An apparatus for processing electronic tag information, the apparatus receiving product identification codes read from electronic tags, each product identification code having a product class identifying code, the apparatus comprising:

a processor; and a storage device, coupled to the processor, having a computer program stored therein;

wherein product information is provided, or stored in the storage device, and wherein the product information comprises first and second information, the first information of each product class having a product class identifying code, a flag indicating whether the product class is a set product class or not, a product name, and a price, the second information of each set product class having a product class identifying code of the set product class, a product class identifying code of individual product class contained in the set product class, and a number of the individual products contained in the set product, wherein both of the product class identifying codes of the set product class and the individual product class are included in the first information, and the computer program causes the processor to perform the steps of:

(a) for each product identification code read from an electronic tag and provided, incrementing a corresponding product cumulative count for a corresponding product class identification code;

(b) determining whether the product identification code read from the electronic tag and provided is for a set product or not by referring to a corresponding flag of the second information, (c) if it is determined that the product identification code is for a set product, subtracting the number of the individual products in the set product by referring to the second information from a corresponding product cumulative count for a corresponding individual product class identification code;

(d) calculating the mathematical product of a product price in the first information and a product cumulative count for each product class identification code; and (e) outputting a receipt to a printer based on the product cumulative count and the calculated mathematical product.

2. The apparatus for processing electronic tag information according to claim 1, further comprising the step of:

(f) in response to the end of information-reading from electronic tags, outputting information associated with a product class identification code whose product cumulative count is negative, and associated with a product cumulative count thereof.

3. The apparatus for processing electronic tag information according to claim 1, wherein, in step (e), the receipt includes outputting the product name, the calculated mathematical product, and the cumulative sum of the product class identification code.

4. The apparatus for processing electronic tag information according to claim 1, wherein a mode signal is further provided, wherein the computer program causes the processor to, in step (d) when the mode signal indicating a sale-statement mode, output deficiency information, as the associated information, of the individual products contained in the set product when the cumulative count of the individual product class is a negative value.

5. The apparatus for processing electronic tag information according to claim 4, wherein the second information is composed of a table having a field of the product class identification code and a field of the flag, wherein the computer program causes the processor to, in step (b), judge whether or not the product name class identification code is for a set product of individual products based on the table.

6. A POS terminal comprising an apparatus for processing electronic tag information, the apparatus receiving product identification codes read from electronic tags, each product identification code having a product class identifying code, the apparatus comprising:

a processor; and a storage device, coupled to the processor, having a computer program stored therein;

wherein product information is provided, or stored in the storage device, and wherein the product information comprises first and second information, the first information of each product class having a product class identifying code, a flag indicating whether the product class is a set product class or not, a product name, and a price, the second information of each set product class having a product class identifying code of the set product class, a product class identifying code of individual product class contained in the set product class, and a number of the individual products contained in the set product, wherein both of the product class identifying codes of the set product class and the individual product class are included in the first information, and the computer program causes the processor to perform the steps of:

(a) for each product identification code read from an electronic tag and provided, incrementing a corresponding product cumulative count for a corresponding product class identification code;

(b) determining whether the product identification code read from the electronic tag and provided is for a set product or not by referring to a corresponding flag of the second information, (c) if it is determined that the product identification code is for a set product, subtracting the number of the individual products in the set product by referring to the second information from a corresponding product cumulative count for a corresponding individual product class identification code;

(d) calculating the mathematical product of a product price in the first information and a product cumulative count for each product class identification code; and (e) outputting a receipt to a printer based on the product cumulative count and the calculated mathematical product, wherein the product information is provided from other information processing apparatus which manages the product information in a unified way.

7. A computer program product, comprising: a computer readable storage medium having a computer program stored thereon for processing electronic tag information, wherein the computer program causes a processor coupled to a storage device to perform the steps of, under the condition that product information is provided, or stored in the storage device, wherein the product information includes: first and second information, the first information of each product class having a product class identifying code, a flag indicating whether the product class is a set product class or not, a product name, and a price, the second information of each set product class having a product class identifying code of the set product class, a product class identifying code of individual product class contained in the set product class, and a number of the individual products contained in the set product, wherein both of the product class identifying codes of the set product class and the individual product class are included in the first information, and (a) for each product identification code read from an electronic tag and provided, incrementing a corresponding product cumulative count for a corresponding product class identification code;

(b) referring to a corresponding flag of the second information for judging whether the product identification code read from the electronic tag and provided is for a set product or not, subtracting the number of the individual products of the set product gotten from the second information from a corresponding product cumulative count for a corresponding individual products class identification code when the judgment is positive;

(c) calculating the mathematical product of a product price in the first information and a product cumulative count for each product class identification code; and (d) outputting a receipt to a printer based on the product cumulative count and the calculated mathematical product.

8. The computer program product according to claim 7, wherein the computer program further causes the processor to perform the steps of:

(e) in response to the end of information-reading from electronic tags, outputting information associated with a product class identification code whose product cumulative count is negative, and associated with a product cumulative count thereof.

* * * * *